United States Patent
Decker et al.

(10) Patent No.: US 11,161,592 B2
(45) Date of Patent: Nov. 2, 2021

(54) TORQUE BOX SLEEVES FOR AIRCRAFT WING ASSEMBLIES

(71) Applicant: Textron Innovations Inc., Providence, RI (US)

(72) Inventors: George Ryan Decker, Fort Worth, TX (US); Steven Allen Robedeau, Jr., Keller, TX (US); Tjepke Heeringa, Dallas, TX (US); David Gordon Carlson, N. Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 146 days.

(21) Appl. No.: 16/567,519

(22) Filed: Sep. 11, 2019

(65) Prior Publication Data

US 2021/0070419 A1      Mar. 11, 2021

(51) Int. Cl.
| | |
|---|---|
| *B64C 3/26* | (2006.01) |
| *B64C 3/18* | (2006.01) |
| *B64C 1/00* | (2006.01) |
| *B64C 29/00* | (2006.01) |

(52) U.S. Cl.
CPC ............... *B64C 3/26* (2013.01); *B64C 3/18* (2013.01); *B64C 29/0033* (2013.01); *B64C 2001/0072* (2013.01)

(58) Field of Classification Search
CPC ....................................................... B64C 3/26
See application file for complete search history.

(56) References Cited

U.S. PATENT DOCUMENTS

| | | | | |
|---|---|---|---|---|
| 2,427,065 A | * | 9/1947 | Nebesar | B64C 3/00 244/123.8 |
| 3,400,904 A | * | 9/1968 | Bede | B64C 3/26 244/124 |
| 4,095,760 A | * | 6/1978 | Sommer | B64C 3/26 156/85 |
| 4,739,954 A | * | 4/1988 | Hamilton | B64C 3/26 244/123.1 |
| 4,749,155 A | * | 6/1988 | Hammer | B64C 3/26 244/119 |
| 5,054,716 A | * | 10/1991 | Wilson | B64C 29/0033 244/56 |
| 6,116,539 A | * | 9/2000 | Williams | B64C 3/10 244/46 |
| 6,280,279 B1 | * | 8/2001 | Tanger | A63H 27/02 446/114 |
| 6,375,120 B1 | * | 4/2002 | Wolnek | B32B 5/28 244/119 |
| 7,762,500 B1 | * | 7/2010 | Dhall | B60F 5/02 244/218 |

(Continued)

*Primary Examiner* — Joseph W Sanderson
(74) *Attorney, Agent, or Firm* — Lawrence Youst PLLC

(57) ABSTRACT

A wing assembly for an aircraft includes a torque box sleeve having an open end and a plurality of integral sides including leading, aft, top and bottom sides that jointlessly form a continuous surface having a generally airfoil shape. The wing assembly includes an internal support subassembly having a plurality of ribs coupled to a central spar. The internal support subassembly is formed into a single component outside the torque box sleeve and inserted into the open end of the torque box sleeve as the single component. The internal support subassembly is coupled to an interior of the torque box sleeve.

20 Claims, 11 Drawing Sheets

(56) References Cited

U.S. PATENT DOCUMENTS

| | | | |
|---|---|---|---|
| 8,439,314 B1* | 5/2013 | Dhall | B64C 3/56 |
| | | | 244/218 |
| 8,678,324 B2* | 3/2014 | Hemmelgarn | B64C 3/48 |
| | | | 244/219 |
| 9,139,284 B1* | 9/2015 | Dhall | B64C 3/185 |
| 9,248,900 B2* | 2/2016 | Jareño Diz Lois | B64C 7/00 |
| 9,352,822 B2* | 5/2016 | Nordman | B29C 66/1162 |
| 9,469,391 B1* | 10/2016 | Dong | B64C 23/076 |
| 9,669,919 B2* | 6/2017 | Garcia Martin | B29C 70/443 |
| 9,731,453 B2* | 8/2017 | Humfeld | B29C 66/73752 |
| 9,944,356 B1* | 4/2018 | Wigley | B64C 3/50 |
| 10,035,300 B2* | 7/2018 | Encinosa | B29C 65/48 |
| 10,196,722 B2* | 2/2019 | Ehrstrom | C22F 1/002 |
| 10,399,285 B2* | 9/2019 | Carlson | B29C 65/48 |
| 10,479,474 B2* | 11/2019 | Shemkunas | B64C 3/26 |
| 10,513,325 B2* | 12/2019 | Kooiman | B64C 3/26 |
| 10,513,326 B2* | 12/2019 | Brakes | B64C 3/26 |
| 10,589,837 B2* | 3/2020 | Wolfe | F16B 5/01 |
| 10,597,141 B2* | 3/2020 | Kordel | B64C 3/26 |
| 10,639,854 B2* | 5/2020 | Carlson | B64C 1/12 |
| 10,647,407 B2* | 5/2020 | Kordel | B64C 3/20 |
| 2007/0011970 A1 | 1/2007 | Hethcock et al. | |
| 2012/0298795 A1* | 11/2012 | Cazals | B64C 5/02 |
| | | | 244/87 |
| 2014/0103160 A1* | 4/2014 | Jareno Diz Lois | B64D 45/02 |
| | | | 244/1 A |
| 2015/0053818 A1* | 2/2015 | Charles | B64C 3/187 |
| | | | 244/124 |
| 2015/0299837 A1* | 10/2015 | Ehrstrom | C22C 21/18 |
| | | | 428/600 |
| 2016/0236768 A1* | 8/2016 | Okamoto | B64C 3/26 |
| 2016/0257427 A1* | 9/2016 | Humfeld | B29C 66/723 |
| 2016/0375631 A1* | 12/2016 | Encinosa | B29D 99/0014 |
| | | | 156/91 |
| 2017/0174313 A1* | 6/2017 | Brakes | B64C 3/28 |
| 2017/0225366 A1* | 8/2017 | Chiang | B64C 3/185 |
| 2017/0225765 A1* | 8/2017 | Wolfe | B64C 3/187 |
| 2017/0225766 A1* | 8/2017 | Carlson | B29C 70/30 |
| 2017/0225767 A1* | 8/2017 | King | B29C 35/045 |
| 2017/0225769 A1* | 8/2017 | Carlson | B29D 99/001 |
| 2018/0001579 A1* | 1/2018 | Carlson | B64C 1/12 |
| 2018/0001590 A1* | 1/2018 | Carlson | B29C 35/02 |
| 2018/0015996 A1* | 1/2018 | Shemkunas | B64C 3/18 |
| 2018/0079487 A1* | 3/2018 | Ivans | B64C 29/0033 |
| 2019/0002078 A1* | 1/2019 | Parham, Jr. | B64C 3/26 |
| 2019/0300148 A1* | 10/2019 | Kordel | B64C 3/26 |
| 2019/0300149 A1* | 10/2019 | Kordel | B64C 3/20 |
| 2019/0376541 A1* | 12/2019 | Ballocchi | B64C 1/12 |

* cited by examiner

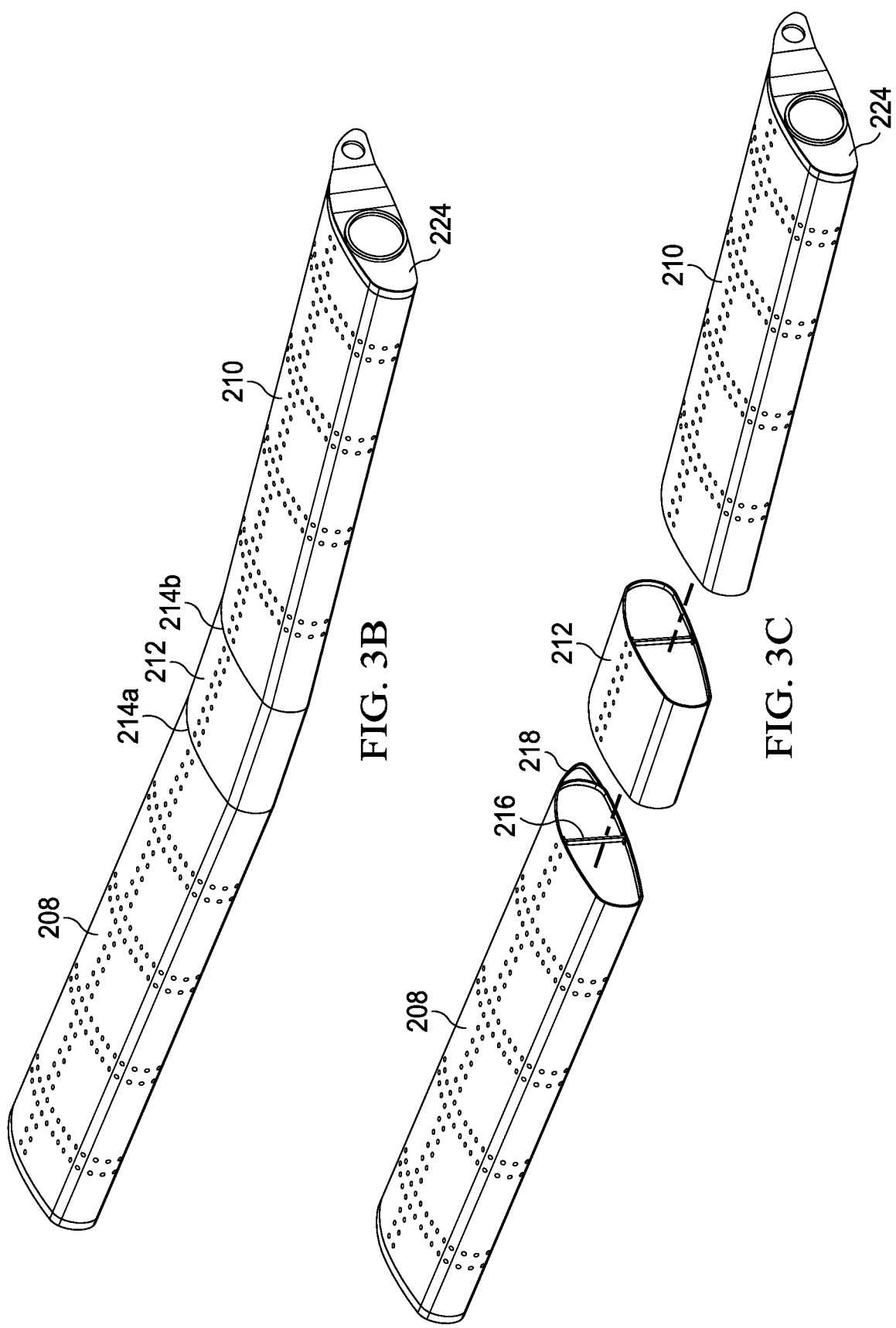

TORQUE BOX SLEEVES FOR AIRCRAFT WING ASSEMBLIES

TECHNICAL FIELD OF THE DISCLOSURE

The present disclosure relates, in general, to wing assemblies for aircraft and, in particular, to aircraft wing assemblies including a torque box sleeve having a plurality of integral sides that jointlessly form a continuous surface with an internal support subassembly coupled to an interior thereof.

BACKGROUND

The airframes of modern aircraft are constructed from a wide variety of materials, including steel, aluminum and composites. While most airframe components are made from strong, rigid materials, in order to conserve weight, certain airframe components are made from relatively thin material layers attached to stiffening structures such as stringers. For example, the wing of a conventional tiltrotor aircraft includes a torque box structure formed from an upper skin, a lower skin, a forward spar and an aft spar. The upper and lower skins have stringers attached thereto that extend generally parallel with the longitudinal axis of the wing to provide stiffness and support to the skins. The stringers may have an I-beam cross section and are typically connected to the interior surface of the skins at reinforcement strips that provide support for the skins against catastrophic buckling, help to maintain the shape and contour of the skins, provide stiffness at the stringer load points and distribute pressure into the skins. In addition, the torque box structure typically includes multiple internal support members that provide horizontal structural strength to the forward and aft spars and the upper and lower skins.

The assembly of the torque box structure for conventional aircraft wings is complex and requires very tight tolerances. For example, the installation of numerous fasteners to the skins and other structural components is difficult and time consuming. In addition, stringers as well as the multiple internal support members reduce the space available for fuel and other internal systems within the torque box structure. Conventional torque box structures are also heavy due to the inclusion of metal materials and thousands of fasteners as well as extra material resulting from the overlap between the spars and skin. Conventional torque box structures are also subject to joint failure and compromised structural integrity due to the presence of spanwise joints between the spars and skin.

SUMMARY

In a first aspect, the present disclosure is directed to a wing assembly for an aircraft including a torque box sleeve having an open end and a plurality of integral sides including leading, aft, top and bottom sides that jointlessly form a continuous surface having a generally airfoil shape. The wing assembly includes an internal support subassembly having a plurality of ribs coupled to a central spar. The internal support subassembly is formed into a single component outside the torque box sleeve and inserted into the open end of the torque box sleeve as the single component. The internal support subassembly is coupled to an interior of the torque box sleeve.

In some embodiments, the torque box sleeve may be formed from one or more composite material layers. In certain embodiments, the torque box sleeve may include rounded corners extending spanwise between the leading, top, aft and bottom sides. In some embodiments, the rounded corners may be reinforced with reinforcement material. In certain embodiments, the wall thickness of the inboard section of the torque box sleeve may be greater than the wall thickness of the outboard section of the torque box sleeve. In some embodiments, the wing assembly may include leading edge cover mounts coupled to the leading side of the torque box sleeve. In certain embodiments, the wing assembly may include one or more ailerons rotatably coupled to the aft side of the torque box sleeve.

In a second aspect, the present disclosure is directed to an aircraft including a fuselage and a wing assembly. The wing assembly includes a torque box sleeve having an open end and a plurality of integral sides including leading, aft, top and bottom sides that jointlessly form a continuous surface having a generally airfoil shape. The wing assembly includes an internal support subassembly having a plurality of ribs coupled to a central spar. The internal support subassembly is formed into a single component outside the torque box sleeve and inserted into the open end of the torque box sleeve as the single component. The internal support subassembly is coupled to an interior of the torque box sleeve.

In some embodiments, the wing assembly may include a center wing mount coupled to the fuselage, and the inboard end of the torque box sleeve may be coupled to the center wing mount. In certain embodiments, the torque box sleeve may include left and right torque box sleeves and the inboard ends of the left and right torque box sleeves may be coupled to the center wing mount. In some embodiments, the center wing mount may be substantially horizontal and the left and right torque box sleeves may have a dihedral configuration. In certain embodiments, a chord line of the torque box sleeve may taper from increasing to decreasing length from the inboard end to the outboard end. In some embodiments, a chord line of the torque box sleeve at the inboard end may be substantially equal to the chord line of the torque box sleeve at the outboard end.

In a third aspect, the present disclosure is directed to a method of manufacturing a wing assembly for an aircraft including applying one or more layers of composite material to form a torque box sleeve having an open end and a plurality of integral sides including leading, aft, top and bottom sides that jointlessly form a continuous surface having a generally airfoil shape; assembling an internal support subassembly including attaching the plurality of ribs to a central spar to form a single component outside of the torque box sleeve; inserting the internal support subassembly as the single component into the open end of the torque box sleeve; and coupling the internal support subassembly to an interior of the torque box sleeve.

In some embodiments, applying one or more layers of the composite material may include using a layup process or automated fiber placement to form the torque box sleeve. In certain embodiments, applying one or more layers of the composite material may include applying braided composite fibers to form the torque box sleeve. In some embodiments, applying one or more layers of the composite material may include winding the composite material on a rotisserie to form the torque box sleeve. In certain embodiments, coupling the internal support subassembly to the torque box sleeve may include coupling the internal support subassembly to the torque box sleeve using a plurality of fasteners or bonding the internal support subassembly to the torque box sleeve using adhesive.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3C are various views of a wing assembly for a tiltrotor aircraft in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
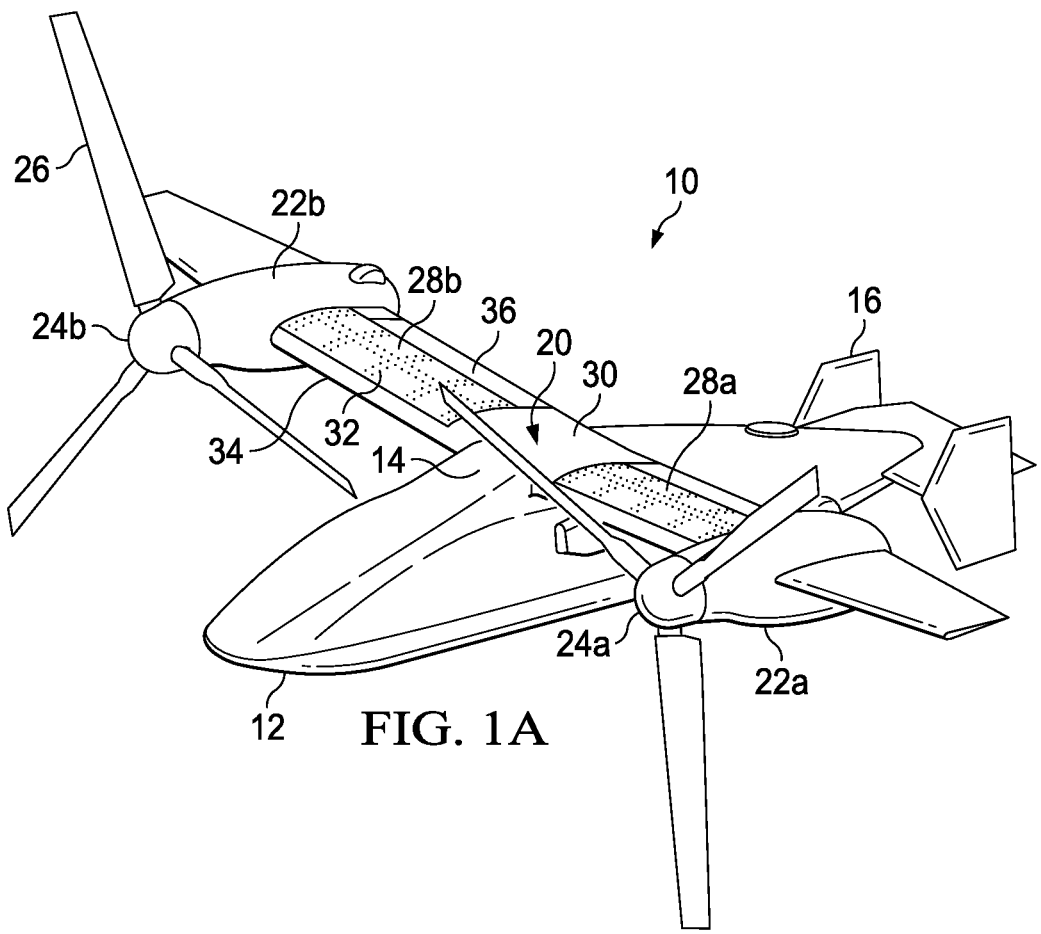
FIGS. 1A-1B are schematic illustrations of a tiltrotor aircraft including a torque box sleeve in accordance with embodiments of the present disclosure.
Figure 1B:
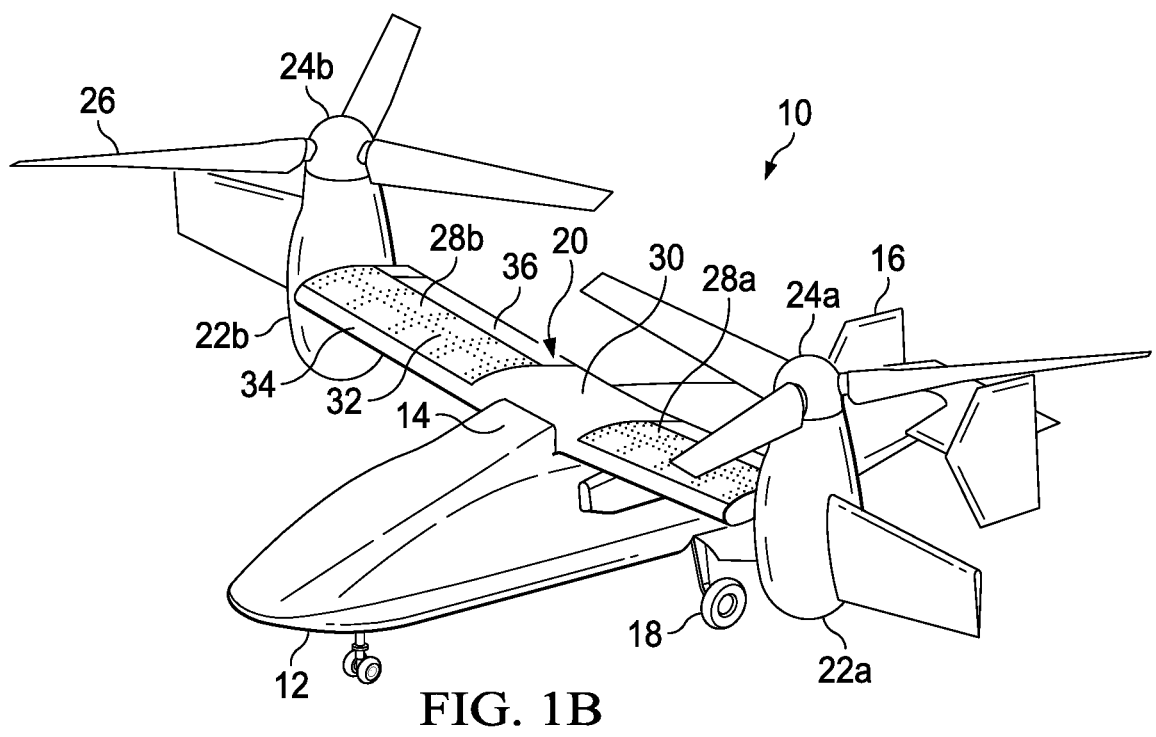

Referring to FIGS. 1A-1B in the drawings, a tiltrotor aircraft is schematically illustrated and generally designated 10. Tiltrotor aircraft 10 includes a fuselage 12, a wing mount assembly 14 and a tail assembly 16. Tail assembly 16 may have control surfaces operable for horizontal and/or vertical stabilization during flight. A landing gear system 18 provides ground support for tiltrotor aircraft 10. A wing assembly 20 is supported by fuselage 12 and wing mount assembly 14. Coupled to the outboard ends of wing assembly 20 are pylon assemblies 22a, 22b. Pylon assembly 22a is rotatable relative to wing assembly 20 between a generally horizontal orientation, as best seen in FIG. 1A, and a generally vertical orientation, as best seen in FIG. 1B. Pylon assembly 22a includes a rotatable portion of a drivetrain and a proprotor assembly 24a that is rotatable responsive to torque and rotational energy provided by an engine or motor of the drivetrain. Likewise, pylon assembly 22b is rotatable relative to wing assembly 20 between a generally horizontal orientation, as best seen in FIG. 1A, and a generally vertical orientation, as best seen in FIG. 1B. Pylon assembly 22b includes a rotatable portion of the drivetrain and a proprotor assembly 24b that is rotatable responsive to torque and rotational energy provided by the engine or motor of the drivetrain.

In the illustrated embodiment, proprotor assemblies 24a, 24b each include three proprotor blade assemblies 26. It should be understood by those having ordinary skill in the art, however, that proprotor assemblies 24a, 24b could alternatively have a different number of proprotor blade assemblies, either less than or greater than three. In addition, it should be understood that the position of pylon assemblies 22a, 22b, the angular velocity or revolutions per minute (RPM) of proprotor assemblies 24a, 24b, the pitch of proprotor blade assemblies 26 and the like may be controlled by the pilot of tiltrotor aircraft 10 and/or a flight control system to selectively control the direction, thrust and lift of tiltrotor aircraft 10 during flight.

FIG. 1A illustrates tiltrotor aircraft 10 in a forward flight mode or airplane flight mode, in which proprotor assemblies 24a, 24b are positioned to rotate in a substantially vertical plane and provide a forward thrust while a lifting force is supplied by wing assembly 20 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor assemblies 24a, 24b are positioned to rotate in a substantially horizontal plane and provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor assemblies 24a, 24b positioned between airplane flight mode and helicopter flight mode, which can be referred to as conversion flight mode.

Wing assembly 20 includes left and right torque box sleeves 28a, 28b that are coupled to a center wing mount 30. Each torque box sleeve 28a, 28b includes an internal support subassembly (not shown) that is disposed within respective torque box sleeves 28a, 28b and coupled thereto using fasteners 32. Torque box sleeves 28a, 28b form a generally airfoil shape. Leading edge covers 34 are coupled to the leading side of torque box sleeves 28a, 28b and ailerons 36 are rotatably coupled to the aft side of torque box sleeves 28a, 28b to enhance the aerodynamic and orientation control capabilities of tiltrotor aircraft 10.

It should be appreciated that tiltrotor aircraft 10 is merely illustrative of a variety of aircraft that can implement the embodiments disclosed herein. Indeed, torque box sleeves 28a, 28b may be implemented on any winged aircraft. Other aircraft implementations can include hybrid aircraft, tiltwing aircraft, quad tiltrotor aircraft, unmanned aircraft, winged gyrocopters, propeller-driven airplanes, winged helicopters, jets, drones and the like. As such, those skilled in the art will recognize that torque box sleeves 28a, 28b can be integrated into a variety of aircraft configurations. It should be appreciated that even though aircraft are particularly well-suited to implement the embodiments of the present disclosure, non-aircraft vehicles and devices can also implement the embodiments.

Figure 2A:
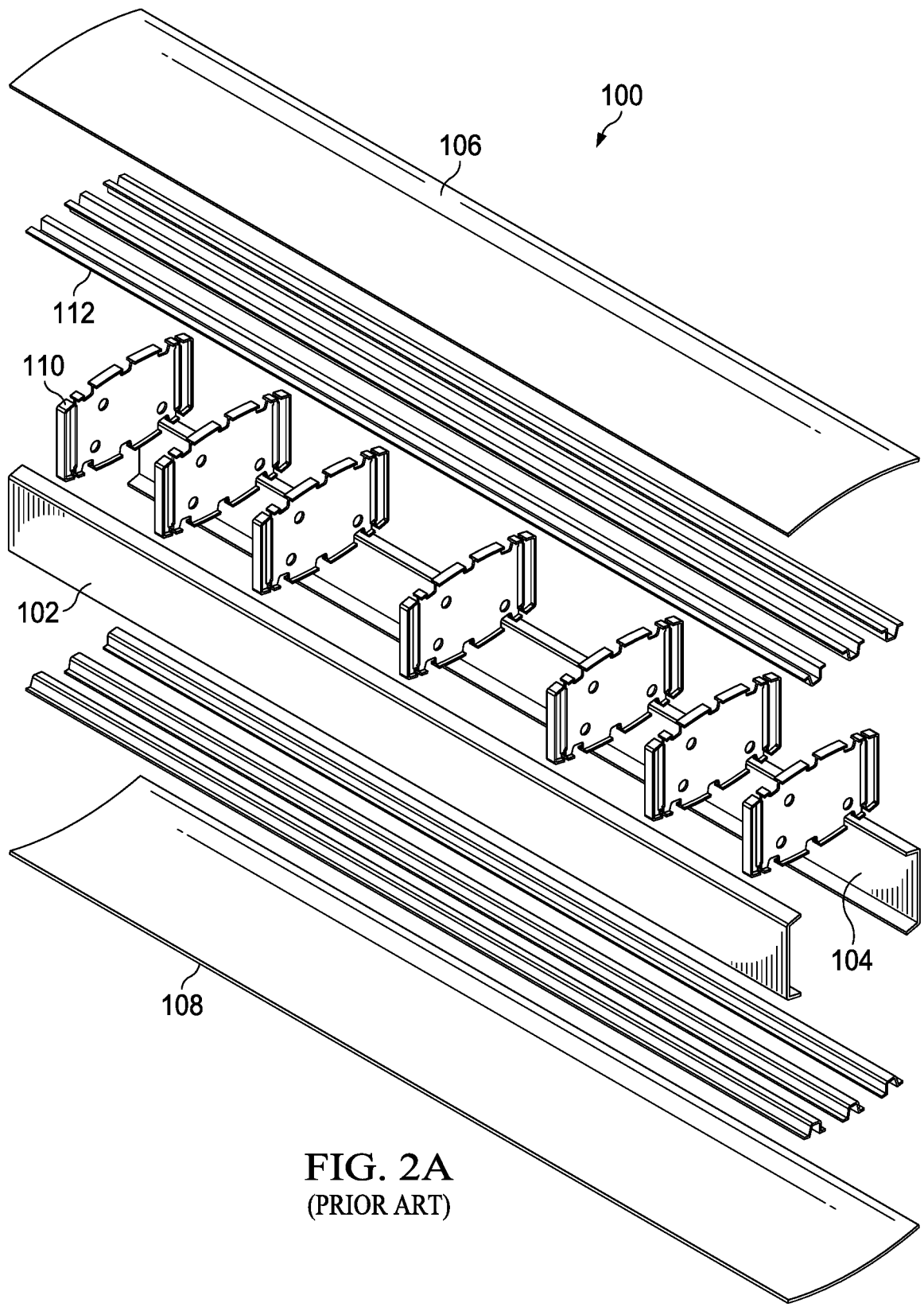
FIGS. 2A-2C are various views of a conventional torque box.
Figure 2B:
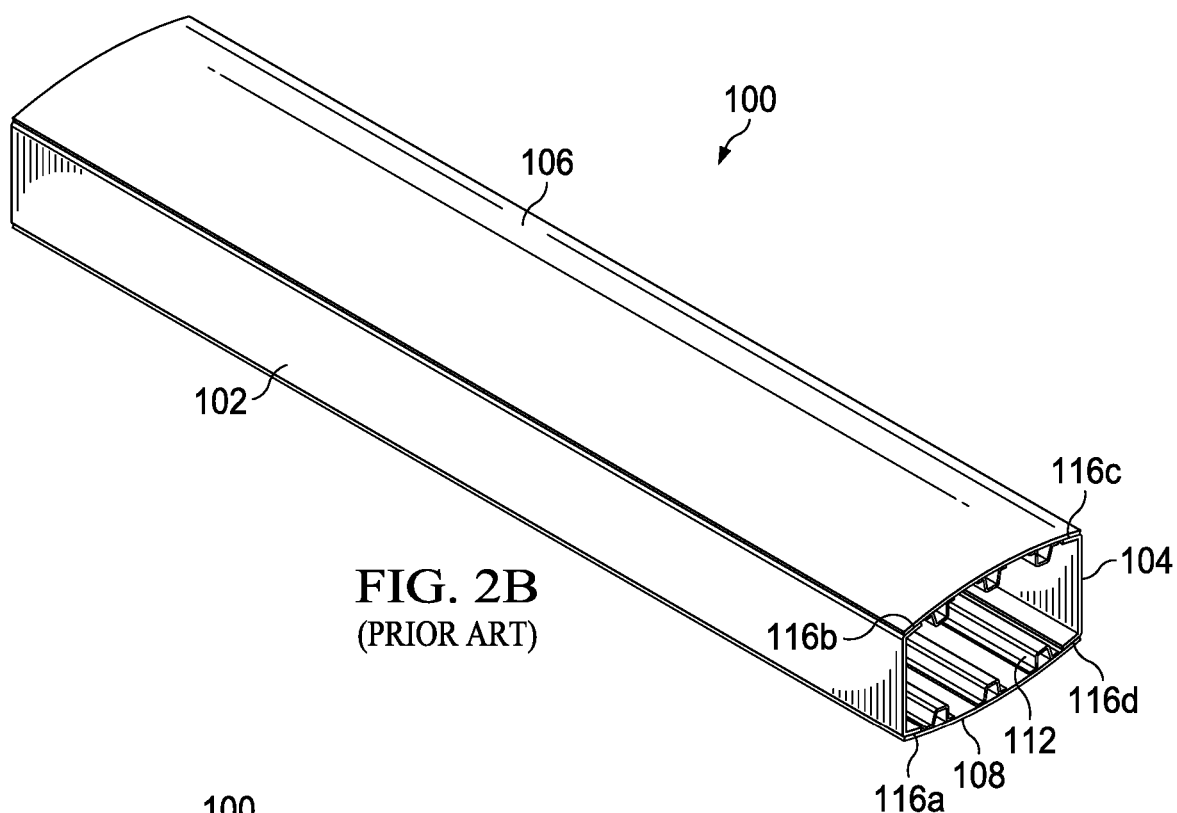
Figure 2C:
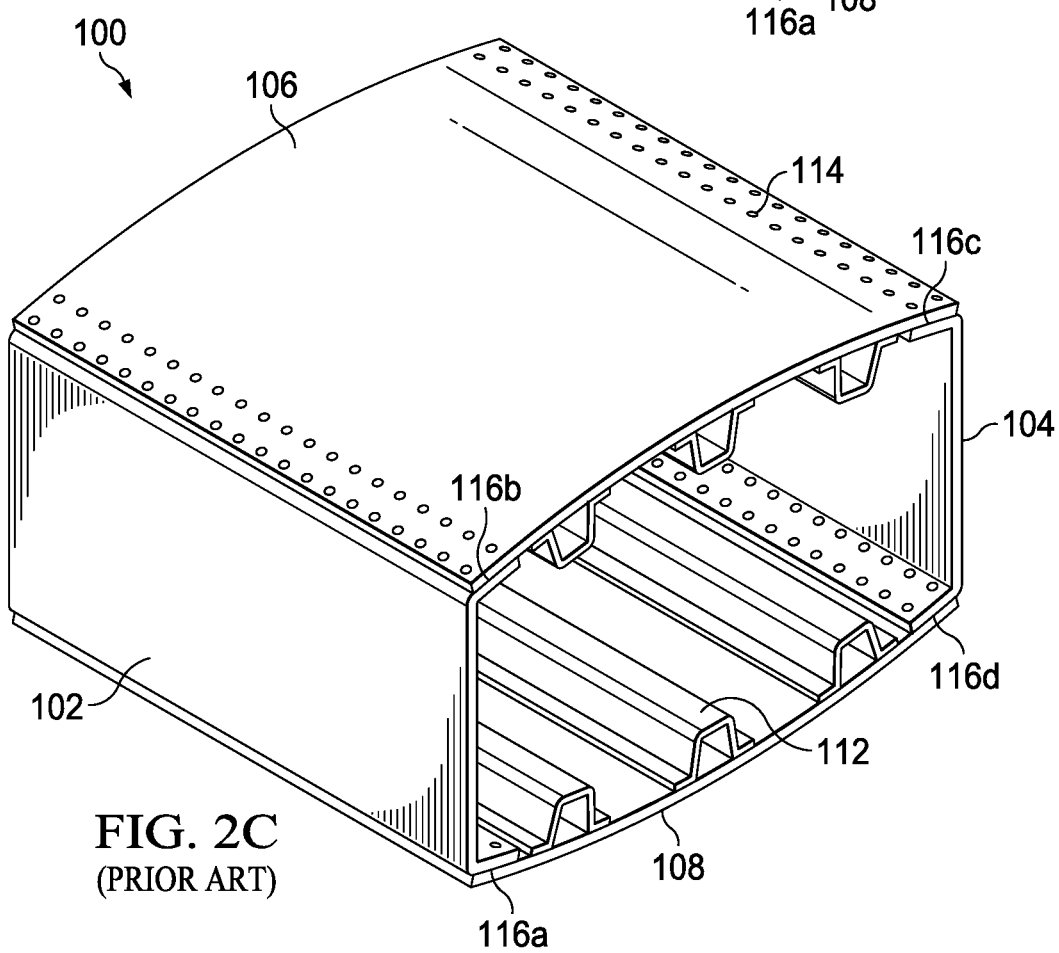

Referring to FIGS. 2A-2C in the drawings, a conventional torque box 100 used to provide support for aircraft wing assemblies is depicted. The outer structure of torque box 100 includes a forward spar 102, an aft spar 104, an upper skin 106 and a lower skin 108. Ribs 110 are spaced along the span of torque box 100 to provide internal structural support. Stringers 112 extend spanwise along torque box 100 and are sandwiched between ribs 110 and skins 106, 108 to provide underlying structural support for skins 106, 108. Torque box 100 is typically assembled by first joining spars 102, 104 to ribs 110 and then covering the top and bottom of ribs 110 with stringers 112 and skins 106, 108. The various torque box components are joined together using aerospace fasteners 114 such as pins, screws, rivets or other fastening devices.

Conventional torque box structures such as torque box 100 suffer from various drawbacks. For example, torque box 100 relies on four continuous spanwise joints 116a, 116b, 116c, 116d between spars 102, 104 and skins 106, 108. The fastener holes required to connect spars 102, 104 to skins 106, 108 at spanwise joints 116a, 116b, 116c, 116d compromise the integrity of the corners of torque box 100 and can lead to structural failure or quality issues. Excess material is also required by the overlap of spars 102, 104 and skins 106, 108 at spanwise joints 116a, 116b, 116c, 116d, which adds to the weight of the aircraft and increases the possibility of joint failure. Spanwise joints 116a, 116b, 116c, 116d also form sharp corners, which decrease the load tolerance of the corners of torque box 100. Torque box 100 also requires the use of heavy and stiff materials with limited adaptability to various manufacturing and assembly methods.

Figure 3A:
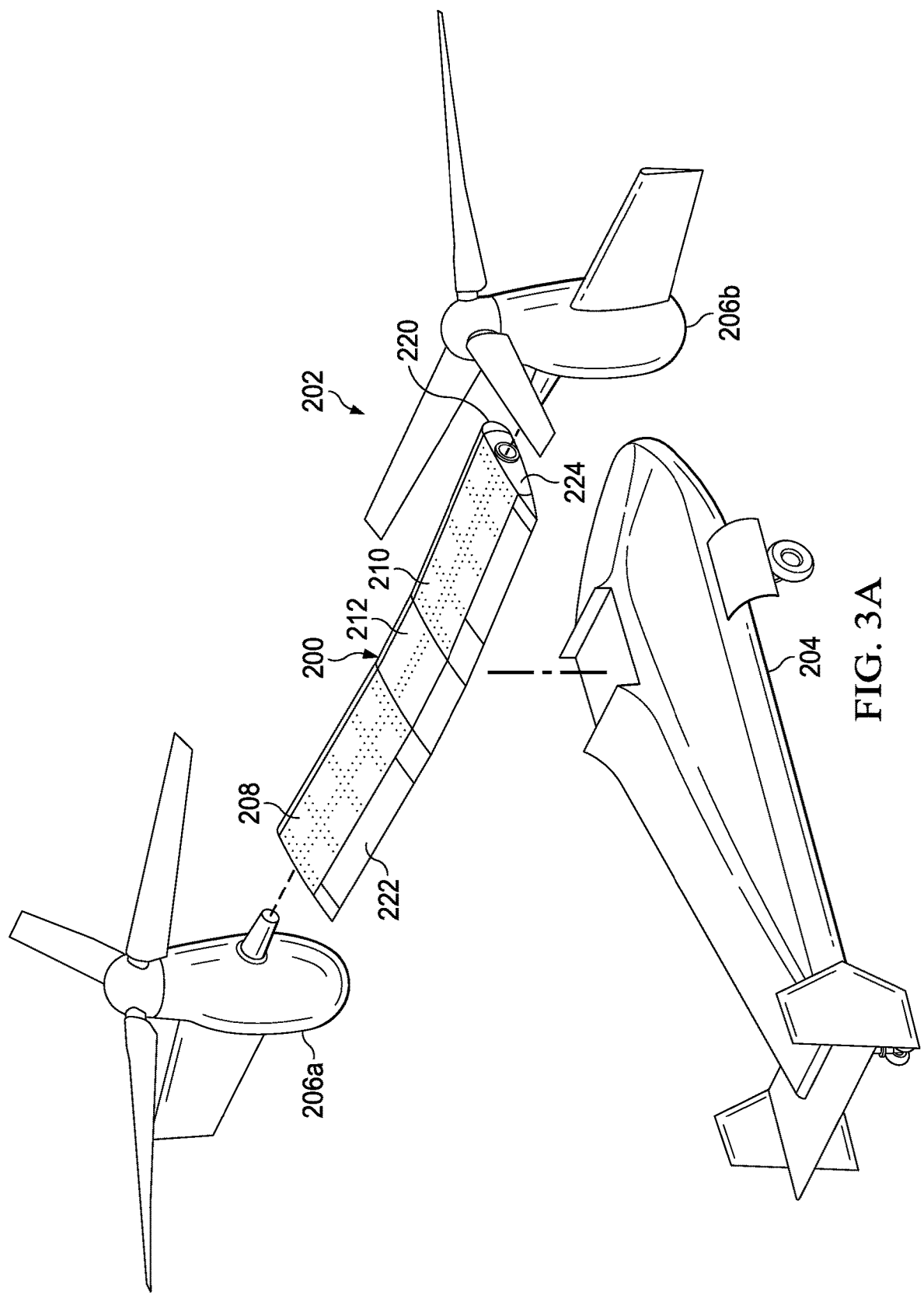
Figure 4A:
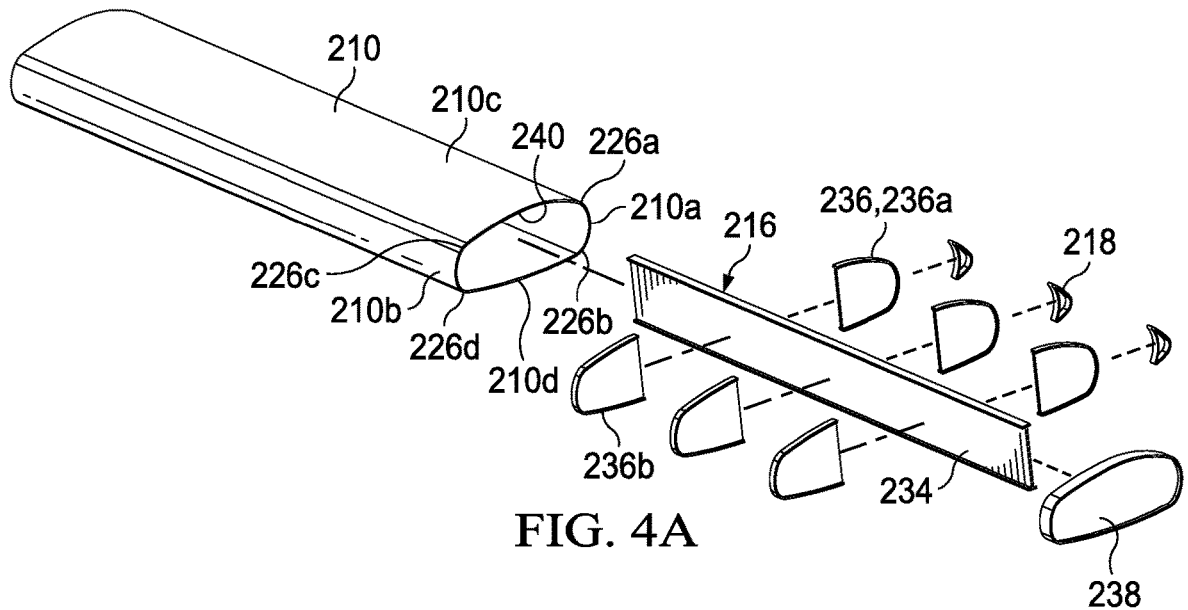
FIGS. 4A-4E are various views of a wing assembly including a torque box sleeve and an internal support subassembly in accordance with embodiments of the present disclosure.
Figure 4B:
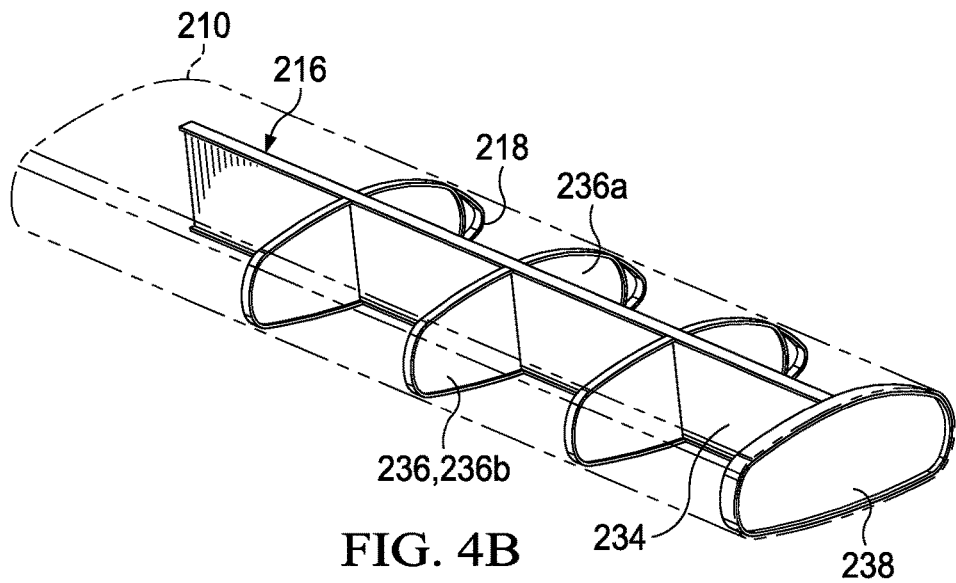
Figure 4C:
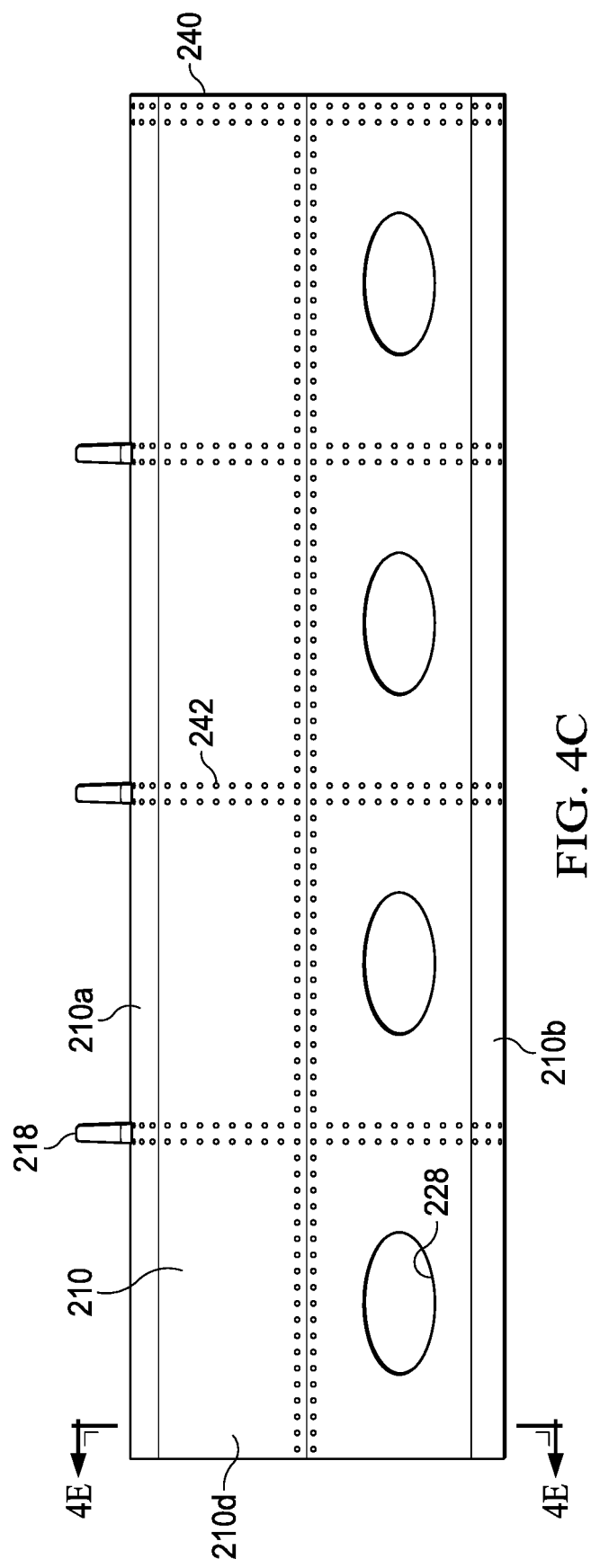
Figure 4D:
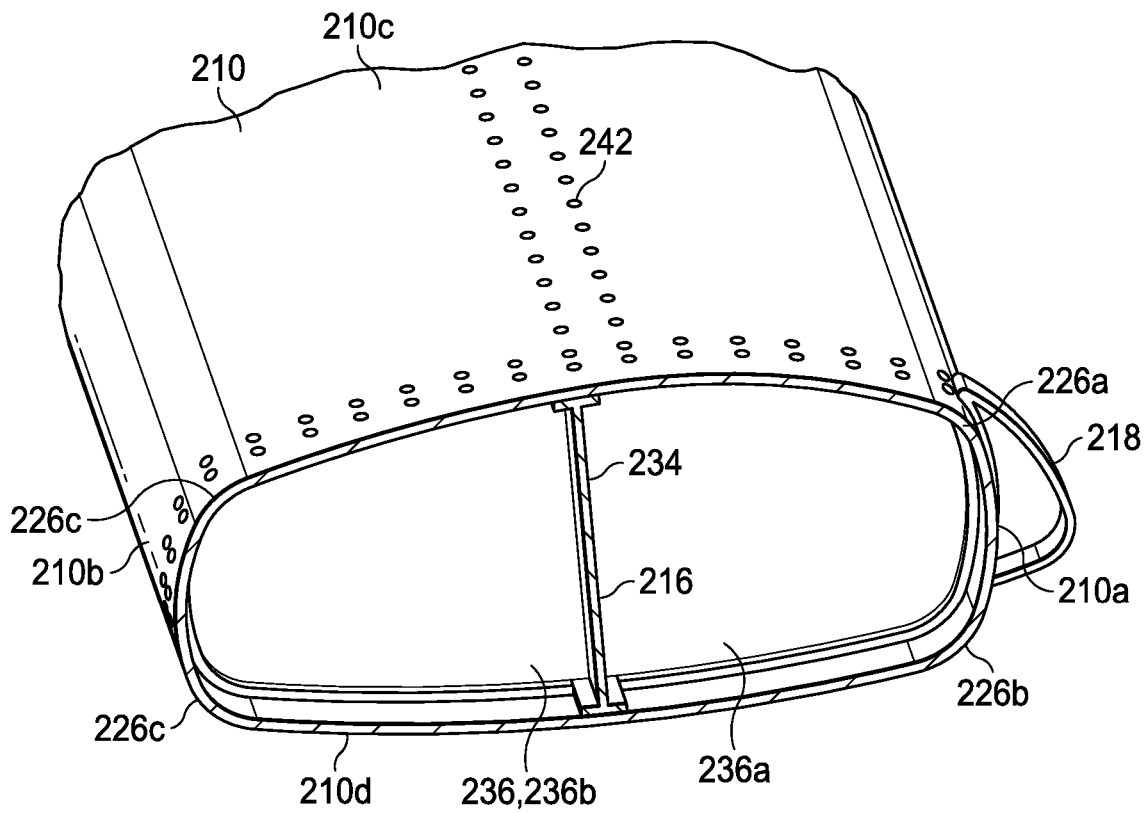
Figure 4E:
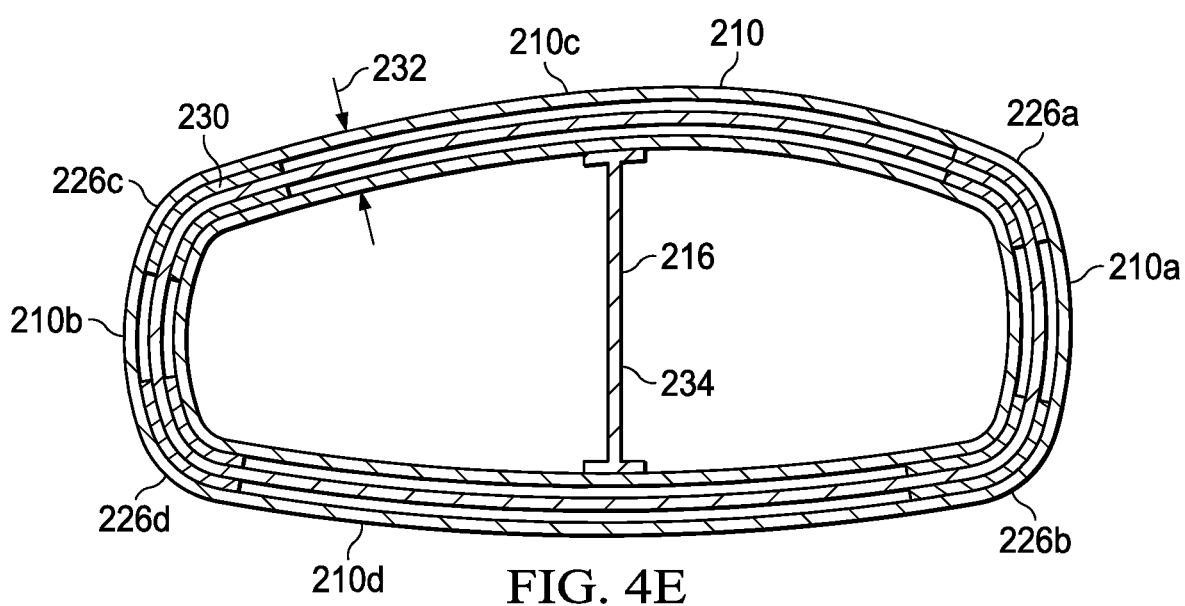

Referring to FIGS. 3A-3C in the drawings, wing assembly 200 of tiltrotor aircraft 202 is depicted. Wing assembly 200 is supported by fuselage 204. Pylon assemblies 206a, 206b are rotatably coupled to the outboard ends of wing assembly 200. Wing assembly 200 includes left and right torque box sleeves 208, 210. The inboard ends of torque box sleeves 208, 210 are coupled to center wing mount 212, which is coupled to the top side of fuselage 204. The inboard ends of torque box sleeves 208, 210 are coupled to center wing mount 212 using splice joints 214a, 214b, although in other embodiments torque box sleeves 208, 210 may be fixedly or rotatably coupled to center wing mount 212 using any type of joint. Center wing mount 212 is substantially horizontal while torque box sleeves 208, 210 point slightly upward to form a dihedral configuration. In other embodiments, torque box sleeves 208, 210 may be horizontal to form a straight wing configuration or may point downward to form an anhedral configuration. The inboard and outboard ends of each torque box sleeve 208, 210 have substantially equal chord line lengths that are substantially uniform along the spans of torque box sleeves 208, 210.

Torque box sleeves 208, 210 are monolithic, composite tubular members that integrate the forward and aft spars and upper and lower skins required by conventional torque boxes such as torque box 100 in FIGS. 2A-2C. Along with internal support subassemblies 216, torque box sleeves 208, 210 and center wing mount 212 form the structural backbone of wing assembly 200 onto which additional wing assembly components may be coupled. Leading edge cover mounts 218 are coupled to the leading sides of torque box sleeves 208, 210 and provide a mounting surface for leading edge cover 220 of wing assembly 200. Ailerons 222 are rotatably coupled to the aft sides of torque box sleeves 208, 210. In some embodiments, end ribs 224 on the outboard ends of torque box sleeves 208, 210 provide mounting surfaces on which pylon assemblies 206a, 206b may be rotatably mounted. Center wing mount 212 may, in some embodiments, be a center torque box sleeve that is integrally and monolithically formed from composite material so that the entire wingspan of wing assembly 200 forms a continuous tubular member to resist or accommodate structural and aerodynamic loads.

Referring to FIGS. 4A-4E in the drawings, various views of the right side of wing assembly 200 including torque box sleeve 210 and internal support subassembly 216 is depicted. Torque box sleeve 210 is substantially similar to torque box sleeve 208 therefore, for sake of efficiency, certain features will be disclosed only with regard to torque box sleeve 210. One having ordinary skill in the art, however, will fully appreciate an understanding of torque box sleeve 208 based on the disclosure herein of torque box sleeve 210. Torque box sleeve 210 is monolithically formed of integral sides including leading side 210a, aft side 210b, top side 210c and bottom side 210d. Torque box sleeve 210 has a generally airfoil shape so that airflow may smoothly pass along top and bottom sides 210c, 210d during flight. Unlike torque box 100 in FIGS. 2A-2C, sides 210a, 210b, 210c, 210d are not separate surfaces or members joined together along spanwise joints, but instead jointlessly form a continuous surface such that sides 210a, 210b, 210c, 210d of torque box sleeve 210 are integral with one another.

In the illustrated embodiment, torque box sleeve 210 has rounded corners extending spanwise between sides 210a, 210b, 210c, 210d including forward-top rounded corner 226a, forward-bottom rounded corner 226b, aft-top rounded corner 226c and aft-bottom rounded corner 226d. Rounded corners 226a, 226b, 226c, 226d help to better distribute loads due to fuel pressure or other sources to reduce stress concentrations on the corners of torque box sleeve 210 as compared to the sharp corners of torque box 100 in FIGS. 2A-2C. Rounded corners 226a, 226b, 226c, 226d may have any radius depending on anticipated loads, aerodynamics or other factors. Bottom side 210d of torque box sleeve 210 may have any number of access holes 228 formed thereon to permit access to the inside of torque box sleeve 210 as may be necessary for maintenance or other purposes. Access holes 228 may be covered using access doors (not shown).

The continuous and jointless structure of torque box sleeve 210 enables torque box sleeve 210 to be manufactured using a wide range of manufacturing processes. Torque box sleeve 210 may be formed from composite materials that may include numerous material plies composed of natural or synthetic and continuous or chopped filaments or fibers including one or more of glass, fiberglass, Kevlar, quartz, polyester, ceramics, polypropylene, carbon, graphite, basalt, aromatic polyamide materials or the like and any combination thereof. The material plies may be in the form of fabrics such as veil mats, short fiber mats, biaxial cloth, triaxial cloth, woven fabrics, tape such as unidirectional tape and the like. Plies or individually-placed fibers may be joined together with a resin such as a polymeric matrix including thermoplastic or thermosetting resin or any suitable resin system such as epoxies, polyimides, polyamides, bismaleimides, polyesters, vinyl esters, polyurethane, phenolics, polyetheretherketones (PEEK), polyetherketones (PEK), polyphenylene sulfides (PPS) and the like. The resins may originate as a liquid and polymerize during the cure process and harden. Fabric that is preimpregnated with resin, or prepreg, may also be used to manufacture torque box sleeve 210. The weight ratio of fibers to resin can range from 20% fibers to 80% resin to 70% fibers to 30% resin, although other ratios are within the scope of the illustrative embodiments. Higher and/or continuous fiber content can provide enhanced strength and stiffness. Fibers, whether individually placed or in sheet form, can be orientated in any direction such as 0, 45 or 90 degrees relative to a reference axis, as in some braided plies, to provide desired strength characteristics such as torsional stiffness. For example, braided off-axis fibers may be integrated to reinforce strength in an off-axis direction. The use of composite materials provides the ability to tailor the combination of fibers and resin to meet design requirements of torque box sleeve 210 such as torsional stiffness and perform better than standard materials.

Torque box sleeve 210 has a simple geometry and monolithic structure that enables a broad goods construction process such as a single layup and single cure. Torque box sleeve 210 may be formed using a broad goods and/or layered tape construction process having a manual or automated layup of a plurality of composite broad goods material layers such as fiberglass fabric, carbon fabric, fiberglass tape, carbon tape and combinations thereof, positioned over one or more molds such as an inner mold line tool, outer mold line tool, open mold or mandrel having simple geometric surfaces with smooth transitions, thus forming a laminate stack. In one non-limiting example, composite material may be wound or braided on a rotisserie to form torque box sleeve 210. The tooling material may have a tailored coefficient of thermal expansion to expand slightly more than the laminate, thus helping to prevent wrinkle creation at rounded corners 226a, 226b, 226c, 226d. Manual, or hand, lay-up composite preforms may be composed of layers at various orientations that are engineered to provide the desired mechanical properties for torque box sleeve 210. The layers of torque box sleeve 210 may also be applied using automated fiber placement in which automated fiber placement machines place fiber reinforcements on molds or mandrels in an automatic fashion and use a number of separate small width tows (e.g., 8 mm or less) of thermoset or thermoplastic preimpregnated materials to form composite layups. The continuous geometric surfaces of sides 210a, 210b, 210c, 210d and rounded corners 226a, 226b, 226c, 226d of torque box sleeve 210 as well as the smooth transitions therebetween improve the manufacturability of torque box sleeve 210, allowing for an entirely automated broad goods layup or the combination of an automated and a manual broad goods layup. Use of broad goods such as a single automated broad goods layup and single cure may enhance producibility and quality due to the reduced complexity of the manufacturing process, but also result in lower production costs, more efficient material usage, reduced labor hours and reduced energy consumption. Even though particular methods of manufacture, composites, components and subassemblies have been described herein, it should be understood by those having ordinary skill in the art that other methods of manufacture, composites, components and subassemblies could alternatively or additionally be used during the manufacture of torque box sleeves of the present disclosure.

In one example, torque box sleeve 210 may be formed using a layup process wherein a plurality of plies, which may be preimpregnated with an uncured resin, are placed in a mold or other support structure. The plies may have the same or different shapes, may be the same or different materials, may have the same or different fabric weaves, may have the same or different thicknesses, may be continuous or discontinuous, may extend beyond the periphery of the mold or be fully contained within the mold, may be oriented in the same or different directions and/or may have other similarities or differences. In one embodiment, the plies may be an intermediate modulus epoxy resin impregnated carbon fiber fabric that is stiffer than conventional composite fabrics, thereby allowing for fewer plies and reducing the weight and manufacturing cost. Each fabric layer is considered a ply of the laminate with the total number of plies ranging from between a single ply to about 100 plies. In the illustrated embodiment shown in FIG. 4E, which is a cross-sectional view of FIG. 4C taken along line 4E-4E, sides 210a, 210b, 210c, 210d of torque box sleeve 210 have a simplified construction of three plies to better illustrate the layered composite structure of torque box sleeve 210, although in other implementations, the total number of plies may be between about 10 plies to about 20 plies, between about 20 plies to about 30 plies, between about 20 plies to about 60 plies, between about 40 plies to about 60 plies and/or any other suitable number of plies. In some embodiments, each ply of torque box sleeve 210 may have ends that are butt-spliced to one another to form a closed loop. It should be noted that gaps have been shown between the layers of torque box sleeve 210 in FIG. 4E for clarity of illustration. It will be understood by those skilled in the art that in the actual layup, adjacent layers would generally be in contact with each other unless another material such as reinforcement material has been interposed therebetween.

Following layup of the plies, the plies may be compacted, or debulked, to remove any pockets of air and to provide adequate attachment therebetween. The compacting step can be achieved by applying a vacuum to the plies in the mold or by pressing a second mold member or roller on the plies. Compacting not only consolidates the layup but also removes air trapped in the resin matrix that would otherwise create undesirable voids (air pockets) in the laminate that could weaken the composite. After the plies are compacted, the plies may be cured to form a laminate by heating and/or pressurizing the plies, such as by heating the plies for two hours at 350 degrees Fahrenheit and at 90 psi. Following the curing process, the laminate may be trimmed or otherwise machined as desired. After curing, the composite material layers form a high strength, lightweight composite torque box sleeve 210. In addition to the aforementioned manufacturing methods, it will be appreciated by one of ordinary skill in the art that the geometry of torque box sleeve 210 is well-suited for a wide variety of additive, subtractive or formative manufacturing techniques including, but not limited to, extrusion, machining, 3D printing, stamping, welding or casting as well as others.

Rounded corners 226a, 226b, 226c, 226d of torque box sleeve 210 may be reinforced with reinforcement material 230. In some embodiments, reinforcement material 230 may include additional composite layers interposed, or interleaved, between the closed loop layers that form torque box sleeve 210. In other examples, reinforcement material 230 may represent thicker plies of composite material at rounded corners 226a, 226b, 226c, 226d. While reinforcement material 230 is illustrated as being interposed between the layers of torque box sleeve 210, in other embodiments reinforcement material 230 may be on the outer and/or inner exposed surfaces of rounded corners 226a, 226b, 226c, 226d. Reinforcement material 230 is not limited to composite material and may be plastic, metal or any other material that reinforces the strength of rounded corners 226a, 226b, 226c, 226d. In some embodiments, wall thickness 232 of torque box sleeve 210 may be uniform along the spanwise length of torque box sleeve 210. In other embodiments, the inboard section of torque box sleeve 210 may have a greater wall thickness 232 than the outboard section of torque box sleeve 210 to provide additional reinforcement at the root sections of wing assembly 200.

Internal support subassembly 216 includes a central spar 234 and ribs 236. Each rib 236 has a forward section 236a and an aft section 236b that couple to the forward and aft sides of central spar 234. In other embodiments, ribs 236 are not divided into forward and aft sections 236a, 236b, but are instead integral ribs that slide or fit onto central spar 234, which may include notches to receive ribs 236. End rib 238 couples to the outboard end of central spar 234. Central spar 234, ribs 236 and end rib 238 may be formed of any material capable of providing internal structural support for torque box sleeve 210 such as carbon, composite or metal (e.g., aluminum or titanium). Central spar 234, ribs 236 and end rib 238 may be manufactured using any additive, subtractive or formative manufacturing technique including, but not limited to, extrusion, machining, 3D printing, stamping, welding or casting as well as others. In some embodiments, the same and/or similar processes used to form torque box sleeve 210 may be used to form central spar 234, ribs 236 and/or end rib 238.

Internal support subassembly 216 is preassembled outside of torque box sleeve 210 by attaching ribs 236 and end rib 238 to central spar 234. Internal support subassembly 216 thus forms a single component outside of torque box sleeve 210. After curing torque box sleeve 210 and machining or otherwise forming access holes 228, internal support subassembly 216 is inserted as a single component into open end 240 of torque box sleeve 210. Internal support subassembly 216 may be fed into open end 240 of torque box sleeve 210 using a "Christmas tree tool" or other device. Internal support subassembly 216, in particular central spar 234, ribs 236 and end rib 238, may then be coupled to torque box sleeve 210 using fasteners 242. In other embodiments, internal support subassembly 216 is bonded to torque box sleeve 210 using adhesive. A combination of fasteners 242 and adhesive may also be used to couple internal support subassembly 216 to torque box sleeve 210. Leading edge cover mounts 218 are coupled to ribs 236 with leading side 210a of torque box sleeve 210 sandwiched therebetween. It will be appreciated by one of ordinary skill in the art that internal support subassembly 216 may include any number of spars or ribs to support torque box sleeve 210.

The elimination of sharp transition angles at joints between spars and skins greatly reduces the peel failure mode for bonded ribs and enables a bonded design without the weight penalty of conventional torque boxes such as torque box 100 in FIGS. 2A-2C. Torque box sleeve 210 eliminates four spanwise spar/skin joints as well as thousands of fasteners to reduce part quantity, weight, assembly time, quality issues and potential failures. The elimination of stringers such as stringers 112 in FIGS. 2A-2C further reduces the weight of wing assembly 200 and provides additional room for components inside wing assembly 200. The shape and structure of torque box sleeve 210 increases the number of manufacturing processes that may be employed and enables a higher strength-to-weight ratio.

Figure 5A:
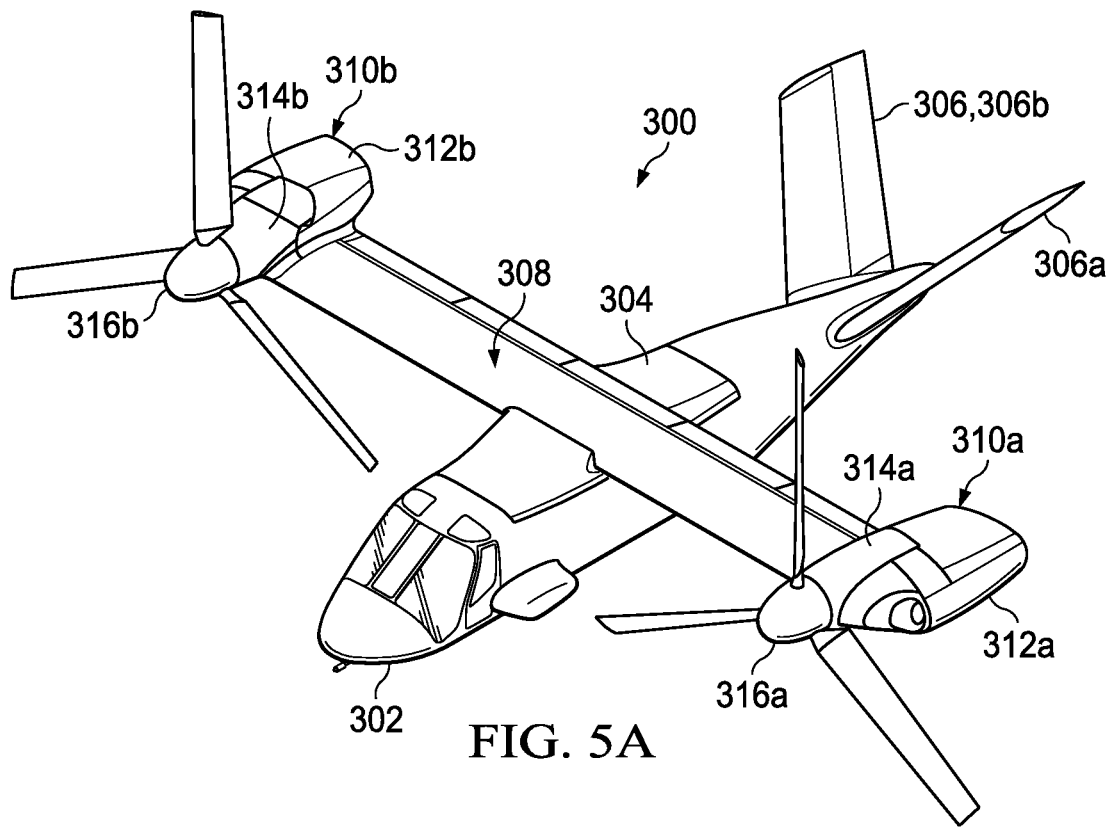
FIGS. 5A-5C are schematic illustrations of a tiltrotor aircraft including a nonsegmented torque box sleeve in accordance with embodiments of the present disclosure.
Figure 5B:
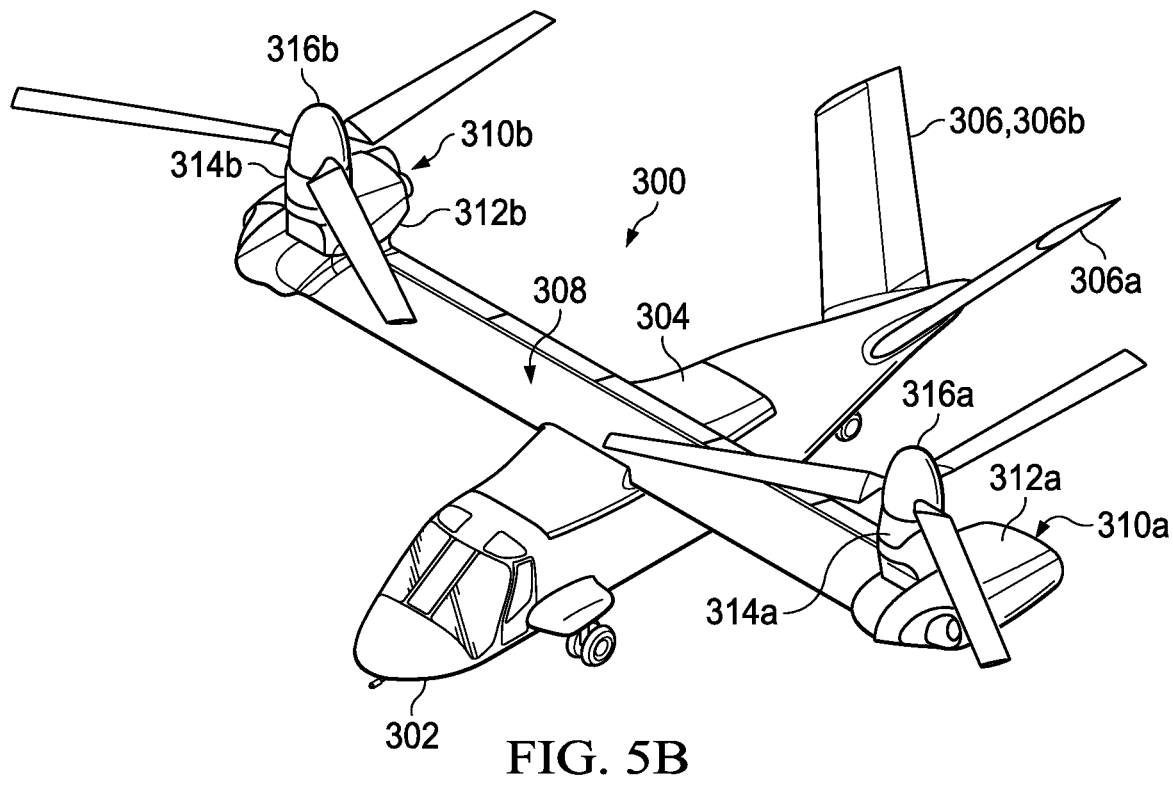
Figure 5C:
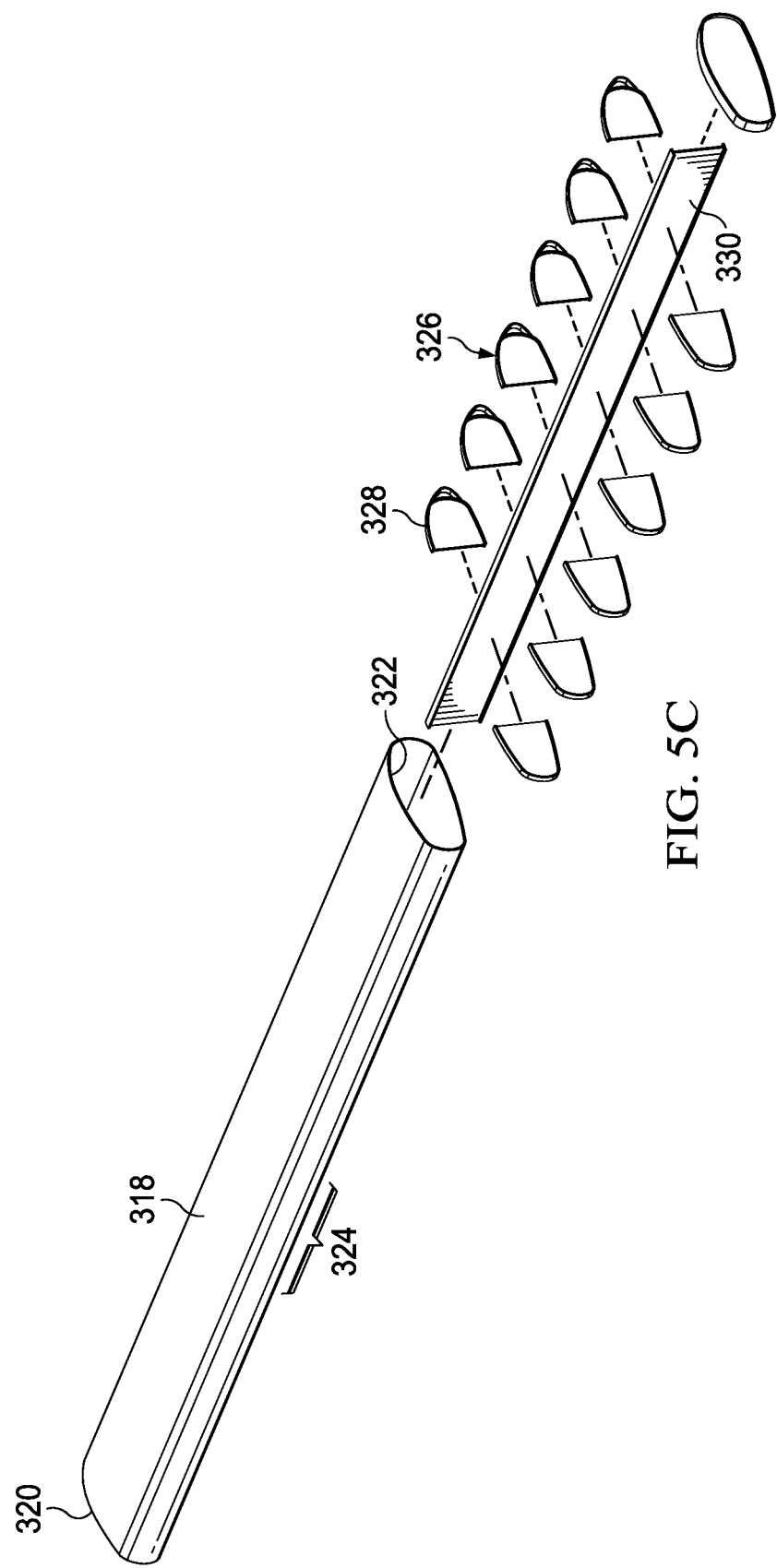

Referring to FIGS. 5A-5C in the drawings, a tiltrotor aircraft is schematically illustrated and generally designated 300. Tiltrotor aircraft 300 includes a fuselage 302, a wing mount assembly 304 and a tail assembly 306 including rotatably mounted tail members 306a, 306b having control surfaces operable for horizontal and/or vertical stabilization during forward flight. A wing assembly 308 is supported by wing mount assembly 304. Coupled to outboard ends of wing assembly 308 are propulsion assemblies 310a, 310b. Propulsion assembly 310a includes a nacelle depicted as fixed pylon 312a that houses an engine and a transmission. Thus, the nacelle is fixed relative to wing assembly 308. In addition, propulsion assembly 310a includes a mast assembly 314a having a mast that is rotatable relative to fixed pylon 312a, wing assembly 308 and fuselage 302 between a generally horizontal orientation, as best seen in FIG. 5A, and a generally vertical orientation, as best seen in FIG. 5B. Propulsion assembly 310a also includes a proprotor assembly 316a, including proprotor blade assemblies radiating therefrom, which is rotatable responsive to torque and rotational energy provided via a rotor hub assembly and drive system mechanically coupled to the engine and transmission housed by fixed pylon 312a. Similarly, propulsion assembly 310b includes a nacelle depicted as fixed pylon 312b that houses an engine and transmission and a mast assembly 314b that is rotatable relative to fixed pylon 312b, wing assembly 308 and fuselage 302. Propulsion assembly 310b also includes a proprotor assembly 316b, including proprotor blade assemblies radiating therefrom, which is rotatable responsive to torque and rotational energy provided via a rotor hub assembly and drive system mechanically coupled to the engine and transmission housed by fixed pylon 312b.

FIG. 5A illustrates tiltrotor aircraft 300 in airplane or forward flight mode, in which proprotor assemblies 316a, 316b are rotating in a substantially vertical plane to provide a forward thrust enabling wing assembly 308 to provide a lifting force responsive to forward airspeed, such that tiltrotor aircraft 300 flies much like a conventional propeller driven aircraft. FIG. 5B illustrates tiltrotor aircraft 300 in helicopter or vertical takeoff and landing (VTOL) flight mode, in which proprotor assemblies 316a, 316b are rotating in a substantially horizontal plane to provide a lifting thrust, such that tiltrotor aircraft 300 flies much like a conventional helicopter. It should be appreciated that tiltrotor aircraft 300 can be operated such that proprotor assemblies 316a, 316b are selectively positioned between forward flight mode and VTOL flight mode, which can be referred to as a conversion flight mode. Even though tiltrotor aircraft 300 has been described as having one engine in each fixed pylon 312a, 312b, it should be understood by those having ordinary skill in the art that other engine arrangements are possible and are considered to be within the scope of the present disclosure including, for example, having a single engine which may be housed within fuselage 302 that provides torque and rotational energy to both proprotor assemblies 316a, 316b.

As seen in FIG. 5C, torque box sleeve 318 of wing assembly 308 is unitary and nonsegmented. Torque box sleeve 318 has outboard ends 320, 322 and a center portion 324 that couples to wing mount assembly 304. Torque box sleeve 318 has a straight wing configuration with a uniform chord line from outboard end 320 to outboard end 322.

Because torque box sleeve 318 is monolithically formed across the entire span of wing assembly 308, torque box sleeve 318 does not include torque box sleeve segments that are spliced to a center wing mount. Likewise, internal support subassembly 326, formed from ribs 328 attached to central spar 330, extends along the span of wing assembly 308 and provides internal support for the entire spanwise length of torque box sleeve 318. After internal support subassembly 326 is assembled outside of torque box sleeve 318, internal support subassembly 326 may be inserted into either outboard open end 320, 322 of torque box sleeve 318. In the illustrated embodiment, internal support subassembly 326 is bonded to the inner surface of torque box sleeve 318 using adhesive and does not require fasteners.

Figure 6A:
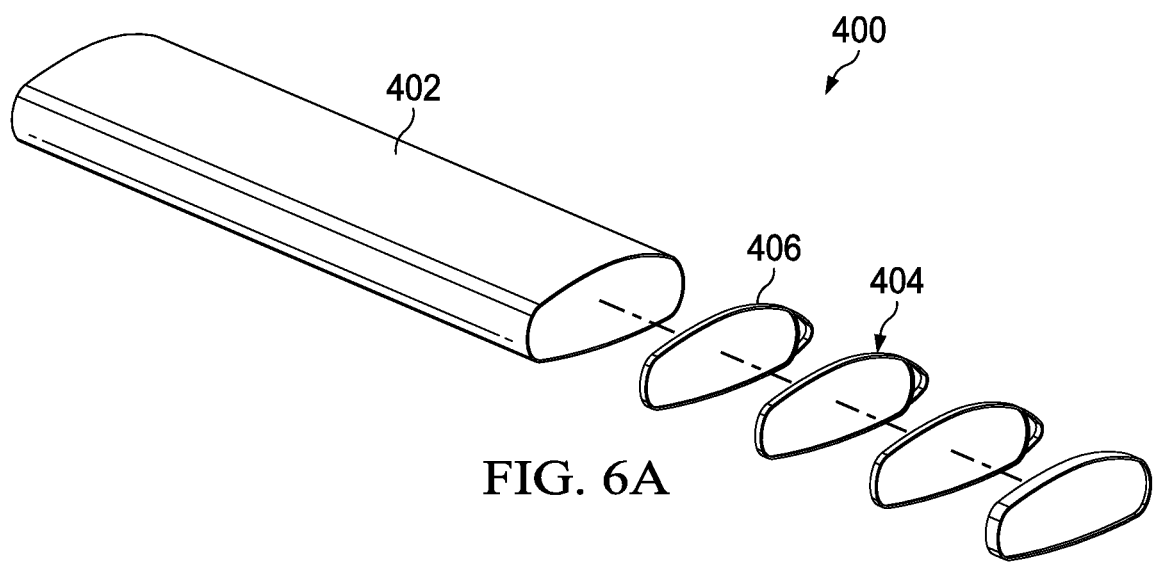
FIGS. 6A-6B are exploded views of various wing assemblies having different shapes or internal support subassemblies in accordance with embodiments of the present disclosure.
Figure 6B:
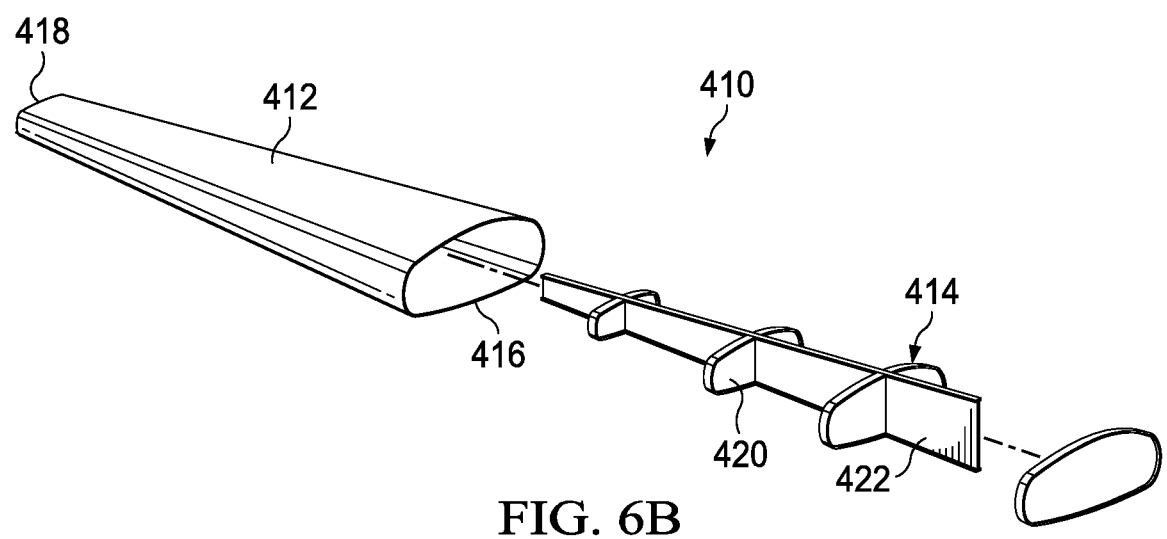

Referring to FIGS. 6A-6B in the drawings, wing assemblies having different configurations are depicted. In FIG. 6A, wing assembly 400 includes torque box sleeve 402 and internal support subassembly 404. Internal support subassembly 404 lacks a spar interconnecting ribs 406. Ribs 406 may be inserted into torque box sleeve 402 to provide internal support thereto. Wing assembly 400 benefits from a lower weight due to the lack of a spar inside of torque box sleeve 402. In some embodiments, torque box sleeve 402 may be reinforced to compensate for the lack of a spar. In FIG. 6B, wing assembly 410 includes tapered torque box sleeve 412 and internal support subassembly 414. The chord line of torque box sleeve 412 tapers from increasing to decreasing length from inboard end 416 to outboard end 418 of torque box sleeve 412. The height of tapered torque box sleeve 412 may also taper from increasing to decreasing height from inboard end 416 to outboard end 418. Ribs 420 also change progressively in size to fit inside tapered torque box sleeve 412 and provide adequate internal support thereto. In particular, the outboard rib is the smallest of ribs 420 and the inboard rib is the largest of ribs 420. Central spar 422 may also have a tapered height that is tapered from increasing to decreasing height from its inboard to outboard ends to accommodate the tapered height of tapered torque box sleeve 412.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A wing assembly for an aircraft comprising:
   a torque box sleeve having an open end, an inboard section, an outboard section and a plurality of integral sides including leading, aft, top and bottom sides that jointlessly form nonoverlapping transitions between the leading, aft, top and bottom sides and a continuous surface having a generally airfoil shape, the torque box sleeve formed from a plurality of composite material plies, the inboard section of the torque box sleeve formed from a greater number of composite material plies than the outboard section of the torque box sleeve such that the inboard section of the torque box sleeve has a greater wall thickness than the outboard section of the torque box sleeve; and
   an internal support subassembly including a plurality of ribs coupled to a central spar, the internal support subassembly formed into a single component outside the torque box sleeve and inserted into the open end of the torque box sleeve as the single component, the internal support subassembly coupled to an interior of the torque box sleeve.

2. The wing assembly as recited in claim 1 wherein the torque box sleeve includes a plurality of rounded corners extending spanwise between the leading, top, aft and bottom sides.

3. The wing assembly as recited in claim 2 wherein the rounded corners are reinforced with reinforcement material.

4. The wing assembly as recited in claim 1 further comprising a plurality of leading edge cover mounts coupled to the leading side of the torque box sleeve.

5. The wing assembly as recited in claim 1 further comprising one or more ailerons rotatably coupled to the aft side of the torque box sleeve.

6. The wing assembly as recited in claim 1 wherein the torque box sleeve has inboard and outboard ends and wherein a chord line of the torque box sleeve tapers from increasing to decreasing length from the inboard end to the outboard end.

7. The wing assembly as recited in claim 1 wherein the torque box sleeve has inboard and outboard ends and wherein a chord line of the torque box sleeve at an inboard end is substantially equal to the chord line of the torque box sleeve at the outboard end.

8. The wing assembly as recited in claim 1 wherein each of the leading, aft, top and bottom sides of the inboard section of the torque box sleeve has a greater number of composite material plies than the leading, aft, top and bottom sides respectively of the outboard section of the torque box sleeve.

9. The wing assembly as recited in claim 1 further comprising a plurality of access holes formed through the composite material plies on the bottom side of the torque box sleeve.

10. The wing assembly as recited in claim 1 wherein the plurality of composite material plies are configured to form the torque box sleeve in a single cure.

11. An aircraft comprising:
    a fuselage; and
    a wing assembly supported by the fuselage, the wing assembly comprising:
    a torque box sleeve having an open end, an inboard section, an outboard section and a plurality of integral sides including leading, aft, top and bottom sides that jointlessly form nonoverlapping transitions between the leading, aft, top and bottom sides and a continuous surface having a generally airfoil shape, the torque box sleeve formed from a plurality of composite material plies, the inboard section of the torque box sleeve formed from a greater number of composite material plies than the outboard section of the torque box sleeve such that the inboard section of the torque box sleeve has a greater wall thickness than the outboard section of the torque box sleeve; and
    an internal support subassembly including a plurality of ribs coupled to a central spar, the internal support subassembly formed into a single component outside the torque box sleeve and inserted into the open end of the torque box sleeve as the single component, the internal support subassembly coupled to an interior of the torque box sleeve.

12. The aircraft as recited in claim 11 wherein the torque box sleeve has inboard and outboard ends, further comprising:
a center wing mount coupled to the fuselage, the inboard end of the torque box sleeve coupled to the center wing mount.

13. The aircraft as recited in claim 12 wherein the torque box sleeve further comprises left and right torque box sleeves, the inboard ends of the left and right torque box sleeves coupled to the center wing mount.

14. The aircraft as recited in claim 13 wherein the center wing mount is substantially horizontal and the left and right torque box sleeves have a dihedral configuration.

15. The aircraft as recited in claim 12 wherein a chord line of the torque box sleeve tapers from increasing to decreasing length from the inboard end to the outboard end.

16. The aircraft as recited in claim 12 wherein a chord line of the torque box sleeve at the inboard end is substantially equal to the chord line of the torque box sleeve at the outboard end.

17. The aircraft as recited in claim 11 wherein the wing assembly has first and second outboard ends, further comprising:
first and second pylon assemblies rotatably coupled to the first and second outboard ends of wing assembly, respectively.

18. The aircraft as recited in claim 11 further comprising one or more ailerons rotatably coupled to the aft side of the torque box sleeve.

19. The aircraft as recited in claim 11 wherein the torque box sleeve includes a plurality of rounded corners extending spanwise between the leading, top, aft and bottom sides.

20. The aircraft as recited in claim 11 further comprising a plurality of leading edge cover mounts coupled to the leading side of the torque box sleeve.

* * * * *